Feb. 11, 1941.  L. SCHWARZMAYR  2,231,226
WING SUPPORTED AIRCRAFT
Filed June 21, 1937  4 Sheets-Sheet 1
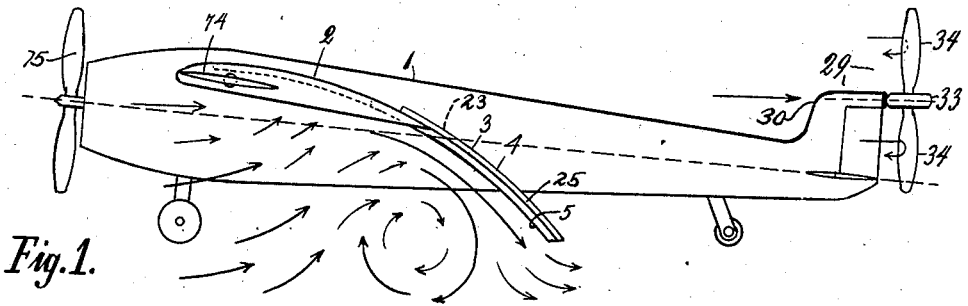
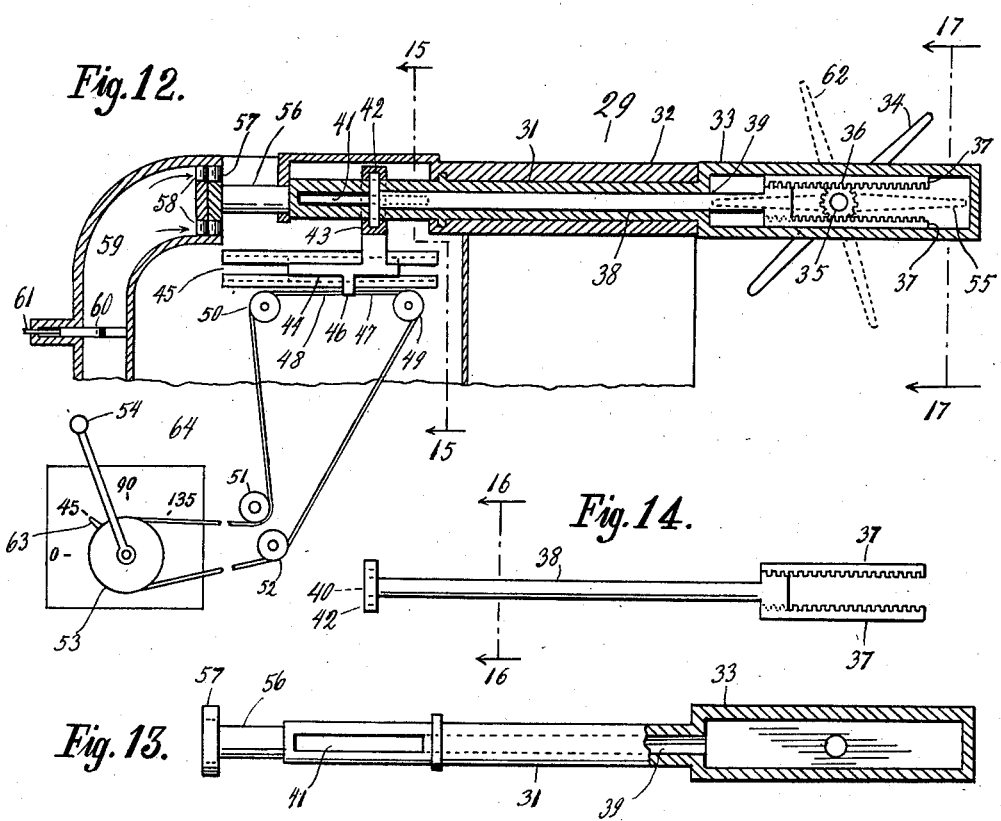
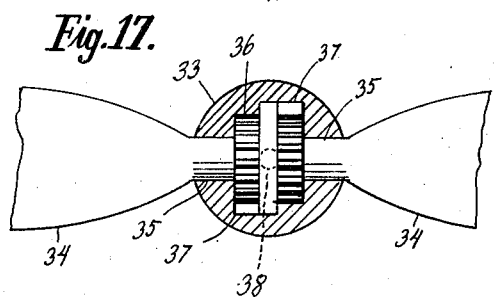
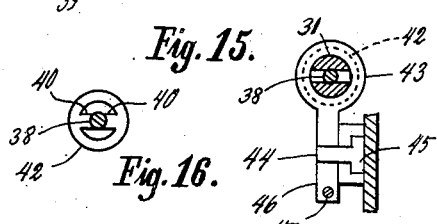
INVENTOR
Ludwig Schwarzmayr

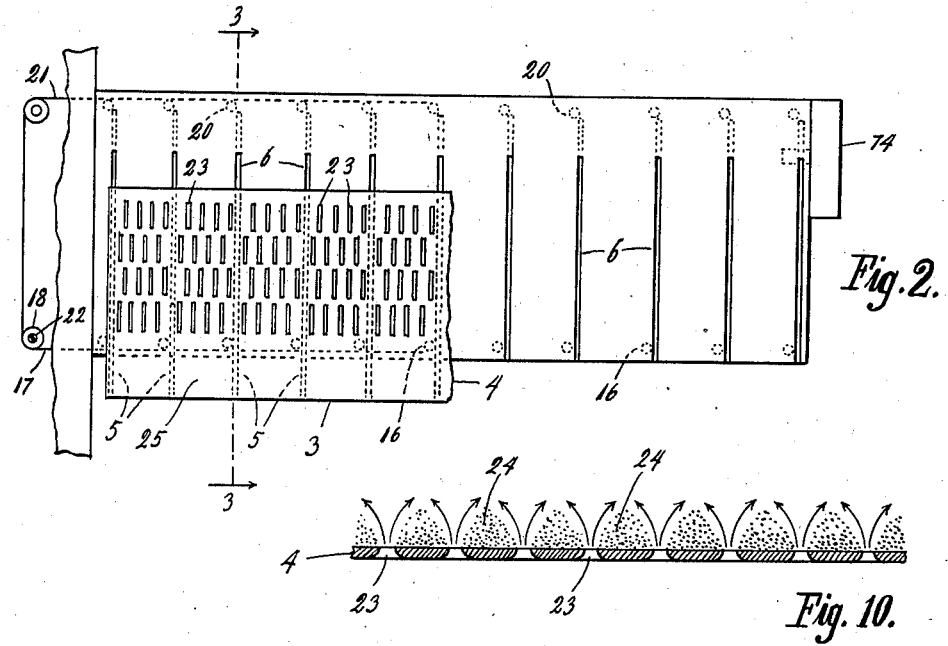
Fig. 2.
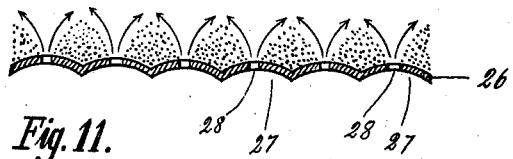
Fig. 10.
Fig. 11.
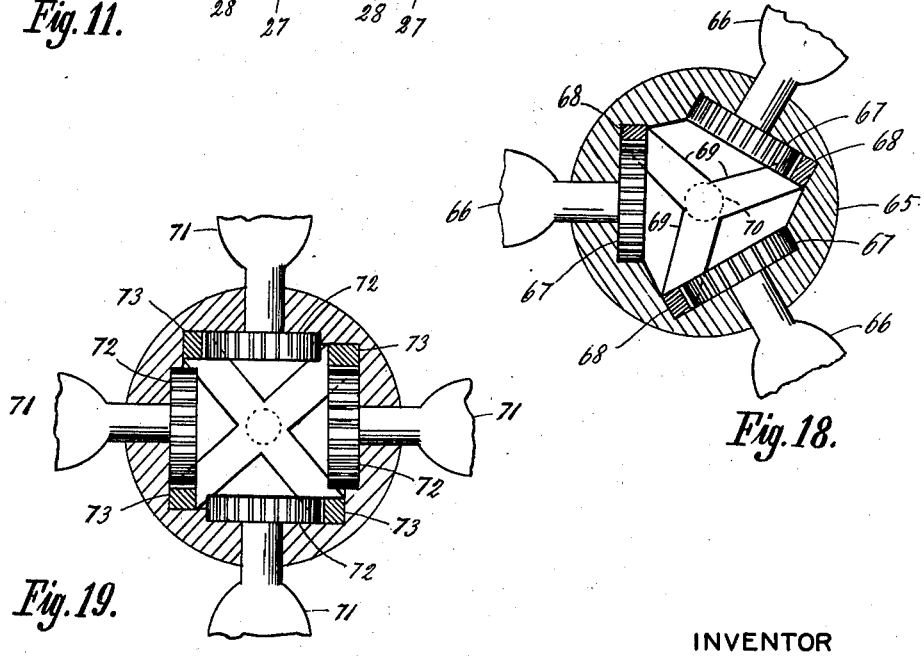
Fig. 18.
Fig. 19.
INVENTOR
Ludwig Schwarzmayr

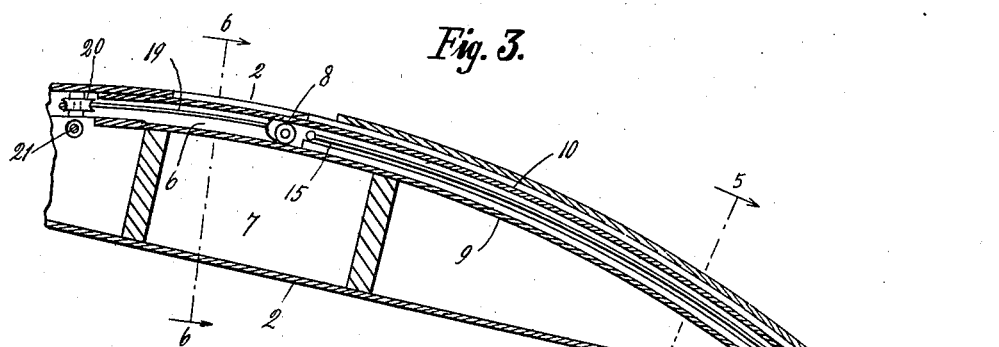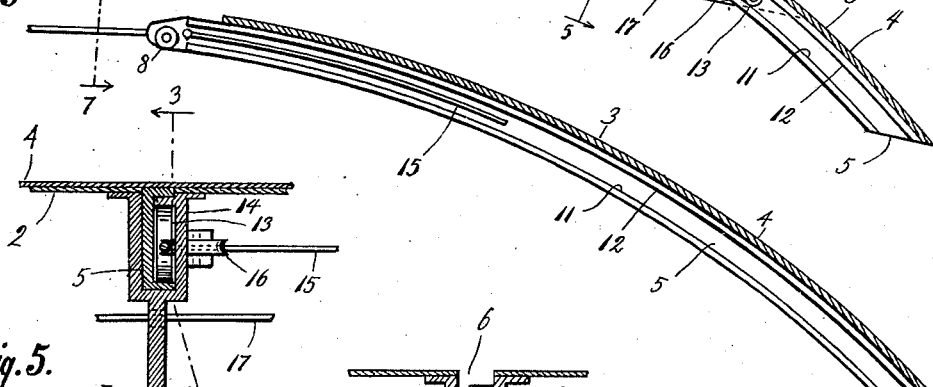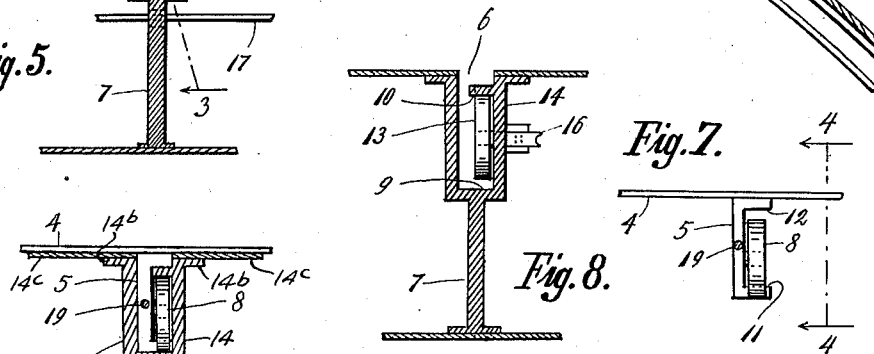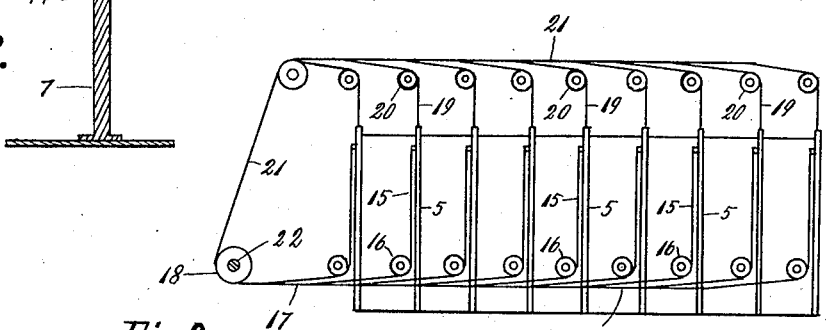

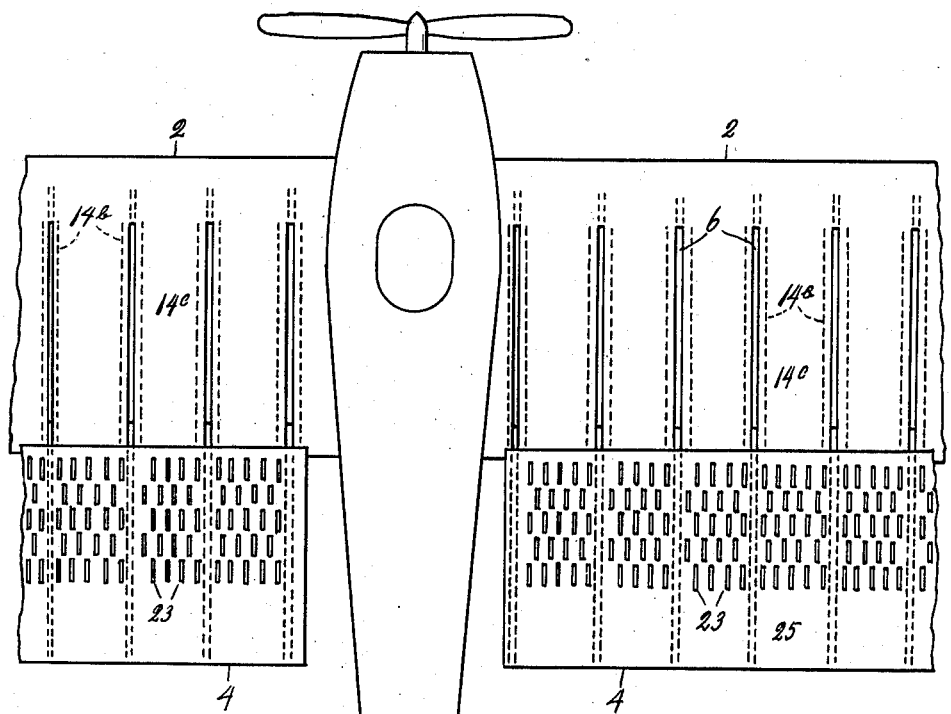
Fig. 20.
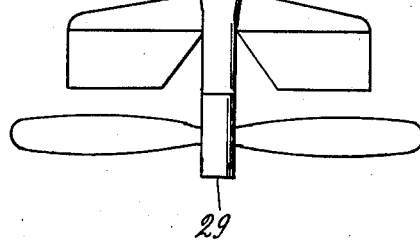
INVETOR:
Ludwig Schwarzmayr

Patented Feb. 11, 1941

2,231,226

UNITED STATES PATENT OFFICE 2,231,226

WING SUPPORTED AIRCRAFT

Ludwig Schwarzmayr, San Francisco, Calif.

Application June 21, 1937, Serial No. 149,421

7 Claims. (Cl. 244—43)

My invention relates to improvements in wing supported aircrafts; and the objects of my improvement are: to provide a wing extension for the aircraft to make landing of the aircraft at a relatively low rate of speed possible, which is relatively light but strong, and when withdrawn avoids resistance to the air; to provide the aircraft with a rotary counteracter which cooperates with the wing extension by preventing the aircraft from changing its axial position relative to the horizontal when air pressure on the wing extension attempts to lift the rear part of the aircraft upward, and which is capable, to prevent tail spin of the aircraft, to prevent a nose dive of the aircraft when landing, and which co-operates with the wing extension to bring the aircraft quickly to a stop; to support the rotary counteracter in a position relative with the aircraft body where it produces a great counteracting force against nosing over force, and where it meets a relatively undisturbed body of air for engagement and to provide the wing extension with means reducing side sliding of the aircraft when the wing extensions are in a steep inclined position relative to the path of travel.

I attain these objects by mechanism illustrated in the accompanying drawings in which—

Figure 1 is a side elevation of the aircraft; Fig. 2, a plan view of the aircraft wing, with part of the wing extension removed; Fig. 3, a sectional view of the wing on line 3—3 in Fig. 2; Fig. 4, the wing extension, shown removed from the guide way in Fig. 3; Fig. 5 a sectional view on line 5—5 in Fig. 3; Fig. 6, a sectional view on line 6—6 in Fig. 3; Fig. 7, a front view of the wing extension taken on line 7—7 in Fig. 4; Fig. 8, a sectional view as shown in Fig. 6, the wing extension shown in Fig. 7 is removed; Fig. 9, a schematic drawing of the adjusting arrangement of the wing extension as seen from below, the slots in the air engaging sheet are not shown; Fig. 10, a cross section of the slotted air engaging sheet of the wing extension shown in Fig. 2; and Fig. 11, a modification of the air engaging sheet. Fig. 12 is a detailed view of the rotary counteracter, shown in Fig. 1 at the tail end of the aircraft; Fig. 13, a veiw of the counteracter hub, shaft and turbine runner, the hub is shown in section; Fig. 14, a view of the blade adjusting rack; Fig. 15, a sectional view of part of the mechanism on the line 15—15, Fig. 12; Fig. 16, a sectional view on the line 16—16, Fig. 14; Fig. 17, an end view of the adjusting mechanism, taken on line 17—17 in Fig. 12; Fig. 18, a modified form of the rotary counteracter, showing three blades; Fig. 19, a modification of the rotary counteracter, showing four blades; and Fig. 20 a plan view of the aircraft, the wings are shown fragmentary.

Similar numerals refer to similar parts throughout the several views.

From the aircraft body 1 extends the wing 2 on which is slidably mounted the wing extension 3, which is formed by the curved air engaging sheet 4 and the ribs 5—5 secured to its underside. The rib 5 is slidingly received in the guide ways 6—6 formed by a chamber in the frame 7 on the upper side of the wing. The roller 8 on the rib 5 is engaged by the members 9 and 11 of the guide way, and the guides 11 and 12 extending from the rib 5 are engaged by the roller 13 on the side wall 14 of the guide way. The guide flange 12 extending from the rib 5 forms the batten to which the sheet 4 is fastened. From the walls 14 and 14ª extend flanges 14ᵇ— 14ᵇ to which are secured the sheets 14ᶜ—14ᶜ forming the top of the wing. The wing extension is operated by the arrangement shown in Fig. 9. Secured to the ribs 5 are the wire cords 15—15, which run over the sheaves 16—16 and are attached to the main cord 17, which is fastened to the drum 18. The cords 19—19 are secured to the end of the ribs 5—5, run over the sheaves 20—20, and their ends are attached to the main cord 21, whose end is secured to the drum 18. When the drum is turned by the shaft 22 one of the cords 17, 21 is wound on the drum and the other is wound from the drum, and the wing extension is moved accordingly. The ribs 5 project downward from the air engaging sheet 3, and plow through the air body which acts as a stabilizer and prevents side slide of the aircraft. When in selecting a spot for landing the aircraft it be necessary to make a turn without sufficient banking the ribs will cause the aircraft to move forward in the direction of its structural line, whereby the downwardly positioned wing extensions engage the body of air in their normal angle of incident and thereby their lift action is maintained during such turn movements. To increase the supporting capacity of the wing extension I prefer an air engaging sheet shown in Figs. 2 and 10. The air engaging sheet 4 has slots 23—23 arranged relatively close together. The air under increased pressure moves through the slots at a high velocity and repels the air moving under low pressure toward the back side of the sheet, whereby a low-pressure zone between the slots is created as is indicated by the dotted areas 24—24. The slots are alined with the path of travel so that the air, when it passes through the slots, acts upon the sides and stabilizes the aircraft. The trailing portion 25 of the wing extension is not slotted so that it may be used in the takeoff when the aircraft is carrying a heavy load. Fig. 11 is a modification of the air engaging sheet, shown in cross section. The sheet 26 has valleys 27, and slots 28 in the valleys, whereby the air pressure at the slots is increased.

In Fig. 1 the arrows indicate the air movement caused by the downward curved wing extension, and illustrate the increase of pressure against the underside of the wing.

To prevent the aircraft from turning over on its nose when landing, to bring it quickly to a stop, and to prevent tail spin when in the air, I provide the aircraft with an adjustable screw counteracter and adjusting and driving mechanism, generally indicated by the reference character 29. The Figs. 12, 13, 14, 15, 16 and 17 are showing the counteracter and its operating mechanism in detail. The counteracter 29 is supported by the upper end of the frame 30 extending upward from the aircraft body 1. The hollow shaft 31 is rotatably mounted on the frame 32, and has a hub 33, on which are adjustably mounted the blades 34—34. The frame 32 is arranged above the conventional tail; the latter is not shown in detail. On the shafts 35—35 of the blades are secured the gears 36—36, which are engaged by the racks 37—37 carried by the rod 38, which is slideable in the bore 39 of the shaft 31. From the end of the rod 38 project arms 40—40, extending through the slots 41 in the shaft, and carry the collar 42, which surrounds the shaft and is longitudinally slidable thereon. The collar 42 rotates in the casing 43 carried by the guide member 44, which is slidingly mounted in the guide way 45. To the member 46 are attached the wire cords 47 and 48 and arranged over the sheaves 49, 50, 51 and 52, and are secured oppositely to the rotatably mounted drum 53, which is provided with a handle 54. The dotted lines 55 indicate the blade 34 in engagement avoiding position. As is shown in the drawing the counteracter is mounted to rotate freely in its bearing, and when the blades are turned to the position shown in full lines the resistance of the air body causes the counteracter quickly to rotate at a high speed. At the end of the shaft extension 56 is a turbine runner 57. At 58 are the guide fans of the turbine. The chamber 59 is connected with a source of liquid under pressure which is controlled by the valve 60 operated by the rod 61. When the hub rotates at a high speed, and the blades are turned to a position beyond ninety degrees from their engagement avoiding position, as shown by the dotted lines 62, the counteracter has great reacting force. By manipulating the blades by the mechanism described above the reacting force can be adjusted quickly to the requirement. On the drum 53 is a hand 63 pointing to the numerals on the indicator 64 to show to the operator the position of the blades. Fig. 18 shows a counteracter in a modified form. On the hub 65 are mounted three blades 66—66, whose gears 67—67 are engaged by the racks 68—68 on the arms 69—69 extending from the adjusting rod 70. Fig. 19 is a modified form of the counteracter showing four blades 71, gears 72 and racks 73.

The aileron 74 is pivotally mounted at the end of the wing.

The landing of the aircraft on rough ground may be conducted in the following manner: The counteracter blades are turned from resistance avoiding position to power receiving position when the aircraft is still flying at high speed. When the counteracter has acquired a high velocity it is increased and maintained by power from the turbine, then the wing extensions are extended in a manner supporting the aircraft at the desired elevation and the counteracter blades are turned to counteracting position in a manner retaining the aircraft in its horizontal position. When the wing extensions are fully extended and the ground is not favorable for landing the propeller 75 of the aircraft is caused to maintain the speed of the aircraft necessary to support the aircraft above but relatively near the ground till the aircraft comes close to a favorable landing place. When arriving at the landing place the counteracter blades are turned to the position producing the greatest counteracting force, whereby the aircraft is caused to settle to the ground and stop with little or no ground run. When in the ground run the wheels of the aircraft encounter obstruction the great counterbalancing force produced by the counteracter arranged above the center of momentum of the aircraft prevents a nosing over of the aircraft.

From the foregoing it is seen that by coaction of the wing extension and the counteracter landing of the aircraft is made much safer.

I claim:

1. An aircraft comprising an aircraft body, wings, wing extensions disposed at the upper side of said wings when in inoperative position and extending rearwardly and downwardly from the trailing edge of the wings when adjusted to lift position, a frame extending upward from the rear part of the aircraft body, and a rotary counteracter supported by said frame with its axis of rotation positioned above the longitudinal axis of the aircraft and spaced therefrom and substantially parallel with the normal flight line of the aircraft, said rotary counteracter comprising variable pitch blades, and means to vary the pitch of said blades to increase or decrease the counteracting force during extending of the said wing extensions.

2. An aircraft comprising an aircraft body, wings, wing extensions normally disposed at the upper side of the wings and extending rearwardly and downwardly from the trailing edge of the wings when extended to lift position, a propeller, a frame extending upward from the rear part of said aircraft body, a rotary counteracter of variable pitch blades supported by said frame above the axis of rotation of said propeller and spaced therefrom and with its axis of rotation substantially parallel therewith.

3. An aircraft comprising an aircraft body, wings, wing extensions normally disposed at the upper side of the wings and extending rearwardly and downwardly from the trailing edge of the wings when extended to lift position, a propeller, a frame extending upward from the rear end of said aircraft body, a rotary counteracter supported by said frame above the axis of rotation of said propeller and spaced therefrom and with its axis of rotation substantially parallel therewith, said rotary counteracter comprising variable blades, means to retain the blades in resistance avoiding position, and means to adjust the blades to different operative positions.

4. In an aircraft, a wing provided with guide chambers in its upper side disposed parallel with the direction of flight, a wing extension comprising an air engaging sheet having ribs longitudinally slidable in said chambers for adjustment rearwardly from the trailing edge of the wing and projecting perpendicularly from its underside, and means for supporting said ribs in extended position corresponding with the upper side of said wing, said sheet having series of slots between said ribs alined with the path of flight.

5. In an aircraft, a wing provided with guide chambers in its upper side alined with the direction of flight, a wing extension comprising an air engaging sheet having ribs longitudinally slidable in said chambers for adjustment rearwardly from the trailing edge of the wing and projecting perpendicularly from its underside, and means for supporting said ribs in extended position corresponding with the upper side of the wing, said sheet having an unslotted trailing portion for adjustment to operative position during a take-off of the aircraft, the forward portion of said sheet having slots between said ribs and alined with the path of flight and for adjustment to operative position for landing the aircraft.

6. A wing extension for extending an aircraft wing rearwardly and downwardly and formed by a sheet having slots alined with the path of travel and arranged in preceding and following series, the slots of the preceding series being alined intermediate the slots of the following series.

7. An aircraft wing extension air engaging sheet for extending an aircraft wing rearwardly and downwardly, the air engaging sheet having concave valleys forming acute ridges between them at the air engaging side and having air passages at the bottom of said valleys.

LUDWIG SCHWARZMAYR.